United States Patent Office 3,642,685
Patented Feb. 15, 1972

3,642,685
FLOWABLE FILLED VINYL SILOXANES CONTAINING HEXAMETHYLDISILAZANES
James E. Matherly, Elizabethtown, Ky., assignor to Dow Corning Corporation, Midland, Mich.
No Drawing. Filed July 9, 1970, Ser. No. 53,693
Int. Cl. C08g 51/04
U.S. Cl. 260—37 SB
18 Claims

ABSTRACT OF THE DISCLOSURE

A mixture of 100 parts by weight of a homogeneous mixture of 50 to 85 weight percent of a vinyl containing organosiloxane polymer, 10 to 35 weight percent hexamethyldisilazane and 4 to 30 weight percent water, and from 125 to 250 parts by weight of a metal oxide filler, such as aluminum oxide is flowable after the volatiles have been removed and is useful as a base for the preparation of flowable silicone rubber compositions. The mixtures are prepared by mixing the polymer, hexamethyldisilazane and water into a homogeneous mixture and thereafter adding the metal oxide filler and removing the volatiles under reduced pressure.

---

This invention relates to a silicone composition which is flowable and the method of preparing it.

Silicone compositions such as resins and rubbers are known to contain fillers to either provide useful properties or reduce their cost. Silicas are the most common filler used in silicone compositions. One property resulting from the addition of a filler to silicone compositions is the increase in viscosity or the stiffening of the resulting composition. This increase in viscosity or stiffening can be a useful property, except where the desired product is, for example, a room temperature vulcanizable silicone rubber and a flowable and pourable composition is desired. Thus, the skilled worker is in a dilemma. He can have a flowable composition or he can add small amounts of filler to gain some property advantages, but he loses the flowable property as he increases the filler loading in an attempt to gain more advantageous properties.

It is, therefore, an object of this invention to provide a silicone composition with a high filler content, but flowable. This object and others will become more apparent from the detailed description.

This invention relates to a mixture consisting essentially of 100 parts by weight of a homogeneous mixture of 50 to 85 inclusive weight percent of a vinyldiorganosiloxy endblocked polydiorganosiloxane where the organic radicals are selected from the group consisting of methyl, vinyl, 3,3,3-trifluoropropyl and phenyl wherein at least 50 percent of the organic radicals are methyl radicals and said polydiorganosiloxane having a viscosity of from 1 to 50.0 poise at 25° C., from 10 to 35 inclusive weight percent hexamethyldisilazane and from 4 to 30 inclusive weight percent water and from 125 to 250 parts by weight of a finely divided metal oxide filler wherein the metal atom is selected from the group consisting of magnesium, zinc, aluminum, iron, titanium and zirconium, where the mixture has a viscosity at 25° C. of from 10 to 600 poise after the removal of any volatile materials under reduced pressure of 10 to 20 mm. of Hg at 100° C. for one hour.

The vinyldiorganosiloxy endblocked polydiorganosiloxanes are well known in the art and can be purchased commercially. The organic radicals, for the purpose of the present invention, can be methyl, vinyl, 3,3,3-trifluoropropyl and phenyl where at least 50 percent of the organic radicals are methyl radicals. Small amounts of other hydrocarbon and halohydrocarbon radicals, such as about 1 or 2 mol percent, can be included in the polydiorganosiloxane without departing from the present invention. The polydiorganosiloxane is composed of diorganosiloxane units bonded through silicon-oxygen-silicon bonds. The diorganosiloxane units can be illustrated by dimethylsiloxane, diphenylsiloxane, methylvinylsiloxane, methylphenylsiloxane and methyl-3,3,3-trifluoropropylsiloxane. The vinyldiorganosiloxy endblocking units can be illustrated by vinyldimethylsiloxy, methylphenylvinylsiloxy, methyl-3,3,3-trifluoropropylvinylsiloxy and the like. The vinyldiorganosiloxy endblocked polydiorganosiloxane can have a viscosity of from 1 to 50.0 poise at 25° C., preferably from 2.5 to 15.0 poise. The most preferred vinyldiorganosiloxy endblocked polydiorganosiloxanes are those which contain only vinyl in the endblocking units and those which contain small amounts of methylvinylsiloxane units such as less than 5 mol percent based on the total moles of siloxane units in the polydiorganosiloxane.

The finely divided metal oxide fillers can be oxides of magnesium, zinc, aluminum, iron, titanium and zirconium. These metal oxides fillers are well known in the art and include, magnesium oxide, zinc oxide, aluminum oxide, ferric oxide, titanium dioxide and zirconium oxide. Any of the finely divided forms of the metal oxides which are conventionally used as fillers are suitable for the present invention.

The mixture of the present invention is prepared by mixing the vinyldiorganosiloxy endblocked polydiorganosiloxane, hexamethyldisilazane and water to form a homogeneous mixture. The order of mixing is not critical, but the water is preferably added to the polydiorganosiloxane and thereafter the hexamethyldisilazane is added. The mixture consists essentially of 50 to 85 inclusive weight percent of the vinyldiorganosiloxy endblocked polydiorganosiloxane, 10 to 35 inclusive weight percent hexamethyldisilazane and 4 to 30 inclusive weight percent water. The ingredients are mixed until a homogeneous mixture is obtained. To 100 parts by weight of this homogeneous mixture, from 125 to 250 parts by weight of the finely divided metal oxide filler is added. The metal oxide filler can be added either all at once or in increments, preferably the filler is added in increments. The resulting mixture is particularly useful as an intermediate in the preparation of silicone rubber. The volatile materials are preferably removed prior to using the mixture in the preparation of the silicon rubber. The volatile materials can be removed by heating under reduced pressure at temperatures up to about 175° C., preferably the volatile materials are removed by heating under reduced pressure at temperatures up to about 175° C., preferably the volatile materials are removed by heating under reduced pressure of 10 to 20 mm. of Hg at 100° C. for one hour. The viscosity of the mixture after heating under reduced pressure of 10 to 20 mm. of Hg at 100° C. for one hour is from 10 to 600 poise at 25° C., preferably from 10 to 250 poise at 25° C.

This mixture can be cured by an organohydrogensiloxane compound having at least three silicon-bonded hydrogen atoms per molecule in the presence of a platinum catalyst. The platinum catalyst is used in catalytic amounts, being at least 0.1 part by weight platinum per million parts by weight of the vinyldiorganosiloxy endblocked polydiorganosiloxane, preferably from 1 to 150 parts by weight plantium per million parts by weight polydiorganosiloxane. The organohydrogensiloxane compound is used in amounts sufficient to provide about one silicon-bonded hydrogen atom per vinyl radical of the polydiorganosiloxane, preferably the ratio of the silicon-bonded hydrogen atom to the vinyl radicals in from 0.67 to 1.5.

The platinum catalysts are well known and any of the platinum catalysts which are readily dispersable in the silicone rubber stock are suitable for the present invention, such as platinic chlorides, salts of platinum, platinum complexes and chloroplatinic acid. The platinum catalyst can be illustrated by, $PtCl_2[P(CH_2CH_2CH_3)_3]_2$, platinum bromides, a complex of platinous halide and an olefin such as ethylene, $Pt(CH_3CN)_2Cl_2$, $[Pt(CH_3CN)_2(CH_3)_4]Cl_2$, $Pt(NH_3)_2Cl_2$,
$K[PtCl_3CH_2CH_2CH_2OH]$, $PtBr_2(C_2H_4)_2$, $K[PtBr_3(C_2H_4)]$,
$PtCl_2(C_2H_4)$, $(CH_3)_2C=CH_2 \cdot PtCl_2$, $H_2Pt(CN)_4 \cdot 5H_2O$,
$H[PtCl_3(CH_3CN)]$, $Pt(NH_3)_2(CNS)_2$, $PtCl_2 \cdot PCl_3$, $[Pt(NH_3)_4] \cdot [PtCl_4]$,
$PtCl_2[P(CH_2CH_3)_3]_2$, $PtCl_2 \cdot P(OH)_3$, $PtCl_2 \cdot P(OCH_2CH_3)_3$,
$PtCl_2 \cdot [P(OCH_2CH_3)_3]_2$, $Pt(OOCCH_2SCH_2CH_3)_2$, $Pt(CN)_3$, $(CH_3)_4Pt$, $(CH_3)_3Pt-Pt(CH_3)_3$, $(CH_3)_3Pt(CH_3COCH=\overset{O}{\overset{\|}{C}}CH_3)$,
$PtCl_2CO$ and $PtBr_2CO$.

The platinum catalysts can also have present inhibitors such as the benzotriazole, a stannous salt, a mercuric salt, a bismuth salt, a cuprous salt, a cupric salt, an acetylenic unsaturated compound such as 2-ethynylisopropanol and the like. The inhibitors, however, are not essential to the present invention.

The silicon compound containing at least three silicon-bonded hydrogen atoms can be any of those well known silicon compounds which contain at least three silicon-bonded hydrogen atoms. These silicon compounds, for the most part, contain silicon-bonded organic groups free of aliphatic unsaturation. The silicon compounds can be illustrated by compounds composed of one or more of the units $HSiO_{1.5}$, $RHSiO$, $R_2HSiO_{0.5}$, and $SiO_2$, where R can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiarybutyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloalpihatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$] - 5 - nonenyl, spiro-[4.5]decyl, dispiro[4.1.4.2]-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

R can be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_fCH_2CH_2$— where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha, alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl. R is preferably methyl, phenyl or 3,3,3-trifluoropropyl. Illustrative of the silicon compounds containing at least three silicon-bonded hydrogen atoms are $HSi[OSi(CH_3)_2H]_2OSi(CH_3)_3$,
$[(CH_3)HSiO]_3$,
$(CH_3)_3SiO[(CH_3)HSiO]_{10}Si(CH_3)_3$,
$[(CH_3)HSiO]_4$,
$Si[OSi(CH_3)_2H]_4$, copolymers of $SiO_2$ and $H(CH_3)_2SiO_{0.5}$, copolymers of $SiO_2$, $(CH_3)_2SiO$ and $H(CH_3)_2SiO_{0.5}$, copolymers of $(CH_3)_3SiO_{0.5}$, $H(CH_3)_2SiO_{0.5}$ and $(CH_3)_2SiO$, copolymers of $(CH_3)HSiO$ and $(C_6H_5)(CH_3)SiO$, copolymers of $(CH_3)SHiO$, $(CH_3)_2SiO$ and $(C_6H_5)_2SiO$, copolymers of $(CH_3)HSiO$ and $(CH_3)_2SiO$, $C_6H_5Si[OSi(C_6H_5)(CH_3)H]_3$

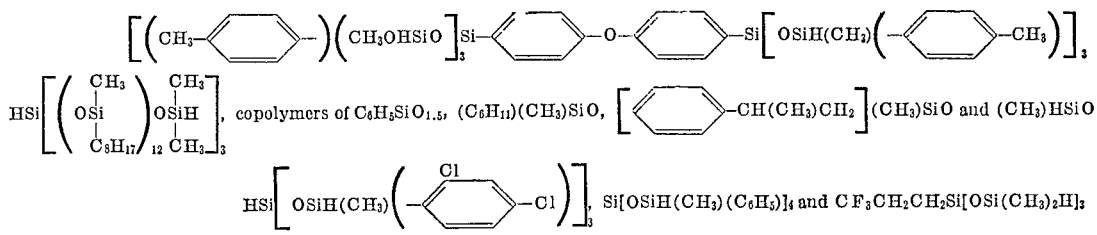

copolymers of $C_6H_5SiO_{1.5}$, $(C_6H_{11})(CH_3)SiO$, $[\langle C_6H_4\rangle\text{-}CH(CH_3)CH_2](CH_3)SiO$ and $(CH_3)HSiO$ $Si[OSiH(CH_3)(C_6H_5)]_4$ and $CF_3CH_2CH_2Si[OSi(CH_3)_2H]_3$ The mixtures of the present invention can readily be stored both with and without the platinum catalyst. The platinum catalyst is preferably added to the mixture, and at the time curing is desired, the organohydrogensiloxane is added. The resulting mixture cures at room temperature unless an inhibitor is used. When an inhibitor is used all the ingredients, the mixture, the platinum catalyst and the organohydrogensiloxane can be stored in one container. All the ingredients even without inhibitor can also be stored in one container, if stored at temperatures below −20° C. When inhibitors are used the composition requires heating above 60° C. to initiate curing.

The silicone rubber compositions as described above are particularly useful as inexpensive, low viscosity, thermally conductive potting compounds with good electrical properties, in view of the high metal oxide filler content.

The following examples are illustrative only and should not be construed as limiting the present invention which is properly delineated in the claims. All parts are parts by weight unless otherwise stated.

EXAMPLE 1

To 56.5 parts of a methylphenylvinylsiloxy endblocked polydimethylsiloxane having a viscosity of 500 cp. at 25° C. was added 15.2 parts of water and mixed for 10 minutes under a nitrogen purge. To this mixture, 28.3 parts of hexamethyldisilazane was added and mixed for 20 minutes under a nitrogen purge. To 100 parts of the resulting mixture, 169.5 parts of aluminum oxide, $Al_2O_3$ was added in three equal proportions. Each proportion was allowed to thoroughly mix before the next proportion was added. The mixture was then mixed for 30 minutes before reducing the pressure to 10 to 20 mm. of Hg. The pressure was reduced slowly and when the pressure reached 10 to 20 mm. of Hg, the mixture was slowly heated by steam heat, continuing for one hour. The mixture was cooled to room temperature and 0.96 part of a chloroplatinic acid catalyst having 0.45 weight percent platinum was added and mixed for 30 minutes. To 10 parts of this mixture 1 part of a cross-linking mixture of 89.7 parts of a methylphenyl-vinylsiloxy endblocked polydimethylsiloxane having a viscosity of 2000 cp. at 25° C., 10.3 parts of a trimethyl-siloxy endblocked copolymer having dimethylsiloxane units and methylhydrogensiloxane units, an average of 10 siloxane units per molecule and 0.75 weight percent silicon-bonded hydrogen atoms and 0.5 part of polymethyl-vinylsiloxane cyclic compounds was added. The resulting mixture had a viscosity of 80 poise at 25° C. The mixture was allowed to cure at room temperature for 24 hours. The cured product had a durometer on the Shore A scale of 67, as determined by ASTM–D–2240 procedure, a tensile strength at break of 210 p.s.i. and an elongation at break of 60% as determined by ASTM–D–412, Die C procedure, a thermal conductivity of $1.49 \times 10^3$ cal./sec./cm.$^2$/cm./° C. as determined by the Cenco-Fitch procedure, a dielectric strength of 515 volts per mil, as determined by ASTM–D–149 procedure, a volume resistivity of $1.4 \times 10^{12}$ ohm-centimeters and a surface resistivity of $4.2 \times 10^{13}$ ohms as determined by ASTM–D–257 procedure, a dielectric constant of 4.97 at $10^2$ hertz and 4.65 at $10^5$ hertz and a dissipation factor of 0.0696 at $10^2$ hertz and 0.0115 at $10^5$ hertz as determined by ASTM–D–150 procedure.

EXAMPLE 2

The procedure as described in Example 1 was used, except the amounts of the ingredients were 65.8 parts of the 500 cp. polydimethylsiloxane, 17.8 parts of water, 16.4 parts of hexamethyldisilazane, 197.4 parts of aluminum oxide and 1.12 parts of the platinum catalyst. This mixture had a viscosity of 260 poise at 25° C. After adding the cross-linking mixture as defined in Example 1, the viscosity was 140 poise at 25° C. The cured product had a durometer on the Shore A scale of 67, a tensile strength at break of 270 p.s.i., an elongation at break of 80%, a thermal conductivity of $1.26 \times 10^3$ cal./sec./cm.$^2$/cm./° C., a dielectric strength of 560 volts/mil, a volume resistivity of $2.5 \times 10^{13}$ ohm-centimeters, a surface resistivity of $1.3 \times 10^{15}$ ohms, a dielectric constant of 4.95 at $10^2$ hertz and 4.748 at $10^5$ hertz and a dissipation factor of 0.0138 at $10^2$ hertz and 0.0100 at $10^5$ hertz.

EXAMPLE 3

The procedure as described in Example 1 was used, except the ferric oxide used herein was added in four equal proportions. The ingredients were 51.7 parts of the 500 cp. polydimethylsiloxane, 22.4 parts of water, 25.9 parts of hexamethyldisilazane, 155.1 parts of ferric oxide, Fe$_2$O$_3$, and 0.86 part of a chloroplatinic catalyst having 0.44 weight percent platinum. Before the cross-linking mixture was added as described in Example 1, the mixture had a viscosity of 80 poise at 25° C. The cured product had a durometer on the Shore A scale of 55, a tensile strength at break of 345 p.s.i., an elongation at break of 170%, a thermal conductivity of $0.767 \times 10^3$ cal./sec./cm.$^2$/cm./° C., a dielectric strength of 480 volts/mil, a volume resistivity of $3.9 \times 10^{14}$ ohm-centimeters, a surface resistivity of $7.0 \times 10^{15}$ ohms, a dielectric constant of 5.74 at $10^2$ hertz and 4.96 at $10^5$ hertz and a dissipation factor of 0.0584 at $10^2$ hertz and 0.0245 at $10^5$ hertz.

EXAMPLE 4

For comparative purposes, the following compositions were prepared wherein the water and hexamethyldisilazane were not used in A., C. and E. The procedures were otherwise the same as described in Example 1.

(A) To 56.5 parts of the 500 cp. polydimethylsiloxane, 169.5 parts of aluminum oxide was added and thereafter 0.86 part of the platinum catalyst was added. The viscosity of this mixture was 1392 poise at 25° C. After adding the cross-linking mixture and curing, the cured product had a durometer on the Shore A scale of 62, a tensile strength at break of 207 p.s.i. and an elongation at break of 70%.

(B) To a mixture of 56.5 parts of the 500 cp. polydimethylsiloxane, 15.1 parts of water and 28.3 parts of hexamethyldisilazane, 169.5 parts of aluminum oxide was added, and thereafter 0.86 part of the platinum catalyst was added. The resulting mixture had a viscosity of 84 poise at 25° C. After adding the cross-linking mixture and curing, the cured product had a durometer on the Shore A scale of 63, a tensile strength at break of 240 p.s.i., an elongation at break of 55%, a thermal conductivity of $0.925 \times 10^3$ cal./sec./cm.$^2$/cm./° C., a dielectric strength of 582 volts/mil, a volume resistivity of $3.2 \times 10^{13}$ ohm-centimeters, a surface resistivity of $8.4 \times 10^{14}$ ohms, a dielectric constant of 4.60 at $10^2$ hertz and 4.38 at $10^5$ hertz and a dissipation factor of 0.0340 at $10^2$ hertz and 0.00913 at $10^5$ hertz.

(C) To 81.3 parts of the 500 cp. polydimethylsiloxane, 244 parts of aluminum oxide was added and thereafter 0.032 part of the platinum catalyst was added. The viscosity of this mixture was 1240 poise at 25° C.

(D) To a mixture of 81.3 parts of the 500 cp. polydimethylsiloxane, 4.1 parts of water and 14.6 parts of hexamethyldisilazane was added 244 parts of aluminum oxide and thereafter 0.032 part of the platinum catalyst was added. The viscosity of this mixture was 200 poise at 25° C.

(E) To 66.7 parts of the 500 cp. polydimethylsiloxane, 133.3 parts of ferric oxide was added. The viscosity of this mixture was 860 poise at 25° C.

(F) To a mixture 66.7 parts of the 500 cp. polydimethylsiloxane, 6.7 parts of water and 26.6 parts of hexamethyldisilazane, 133.3 parts of ferric oxide was added. The viscosity of this mixture was 400 poise at 25° C.

EXAMPLE 5

When magnesium oxide or a combination of magnesium oxide and aluminum oxide is substituted for aluminum oxide in Example 1, equivalent results are obtained.

EXAMPLE 6

The following compositions are equally flowable when prepared by the procedure described in Example 1:

(A)

100 parts of a mixture of 85 parts of a dimethylvinylsiloxy endblocked polymethyl-3,3,3-trifluoropropylsiloxane having a viscosity of 50 poise at 25° C., 35 parts of hexamethyldisilazane and 30 parts of water, and
125 parts of zirconium dioxide filler.

(B)

100 parts of a mixture of 50 parts of diphenylvinylsiloxy endblocked polymethylphenylsiloxane having a viscosity of one poise at 25° C., 10 parts of hexamethyldisilazane and 4 parts of water, and
250 parts of zinc oxide filler.

(C)

100 parts of a mixture of 70 parts of a methylphenylvinylsiloxy endblocked polydiorganosiloxane having 80 mol percent dimethylsiloxane units and 20 mol percent diphenylsiloxane units and having a viscosity of 2.5 poise at 25° C., 20 parts of hexamethyldisilazane and 25 parts of water and
200 parts of titanium dioxide filler.

That which is claimed is:

1. A mixture consisting essentially of 100 parts by weight of a homogeneous mixture of 50 to 85 inclusive weight percent of a vinyldiorganosiloxy endblocked polydiorganosiloxane where the organic radicals are selected from the group consisting of methyl, vinyl, 3,3,3-trifluoropropyl and phenyl wherein at least 50 percent of the organic radicals are methyl radicals and said polydiorganosiloxane having a viscosity of from 1 to 50.0 poise at 25° C. from 10 to 35 inclusive weight percent hexamethyldisilazane and from 4 to 30 inclusive weight percent water and from 125 to 250 parts by weight of a finely divided metal oxide filler wherein the metal atom is selected from the group consisting of magnesium, zinc, aluminum, iron, titanium and zirconium, where the mixture has a viscosity at 25° C. of from 10 to 600 poise after the removal of any volatile materials under reduced pressure of 10 to 20 mm. of Hg at 100° C. for one hour.

2. The mixture in accordance with claim 1 in which the polydiorganosiloxane has a viscosity from 2.5 to 15.0 inclusive poise at 25° C.

3. The mixture in accordance with claim 2 in which the organic radicals are methyl in the polydiorganosiloxane and in the vinyldiorganosiloxy endblocking unit one organic radical is methyl and the other organic radical is phenyl.

4. The mixture in accordance with claim 1 in which the metal oxide is aluminum oxide.

5. The mixture in accordance with claim 2 in which the metal oxide is aluminum oxide.

6. The mixture in accordance with claim 3 in which the metal is aluminum oxide.

7. The mixture in accordance with claim 1 in which the metal is iron oxide.

8. The mixture in accordance with claim 1 in which a platinum catalyst is also present.

9. The mixture in accordance with claim 8 in which the volatile materials have been removed.

10. The mixture in accordance with claim 5 in which a platinum catalyst is also present.

11. The mixture in accordance with claim 6 in which a platinum catalyst is also present.

12. The mixture in accordance with claim 1 in which the volatile materials have been removed.

13. The cured mixture in accordance with claim 12 cured by an organohydrogensiloxane compound having at least three silicon-bonded hydrogen atoms per molecule and a platinum catalyst.

14. The cured mixture in accordance with claim 9, cured by an organohydrogensiloxane compound having at least three silicon-bonded hydrogen atoms per molecule.

15. A method of preparing a flowable siloxane composition comprising
  mixing from 50 to 85 inclusive weight percent of a vinyldiorganosiloxy endblocked polydiorganosiloxane where the organic radicals are selected from the group consisting of methyl, vinyl, 3,3,3-trifluoropropyl and phenyl wherein at least 50 percent of the organic radicals are methyl radicals and said polydiorganosiloxane having a viscosity of from 1 to 50.0 poise at 25° C., from 10 to 35 inclusive weight percent hexamethyldisilazane and from 4 to 30 inclusive weight percent water to form a homogeneous mixture,
  mixing with 100 parts by weight of the homogeneous mixture, from 125 to 250 parts by weight of a finely divided metal oxide filler wherein the metal atom is selected from the group consisting of magnesium, zinc, aluminum, iron, titanium and zirconium, and thereafter
  removing any volatile materials at reduced pressure at temperatures from ambient temperature to 175° C. inclusive whereby the resulting mixture has a viscosity at 25° C. of from 10 to 600 poise.

16. The method in accordance with claim 15 in which the metal oxide is aluminum oxide.

17. The method in accordance with claim 15 in which a platinum catalyst is added to the resulting mixture.

18. The method in accordance with claim 17 in which an organohydrogensiloxane compound having at least three silicon-bonded hydrogen atoms per molecule is added to the resulting mixture containing the platinum catalyst and thereafter the resulting mixture is allowed to cure.

References Cited
UNITED STATES PATENTS

| | | | |
|---|---|---|---|
| 3,428,599 | 2/1969 | Newing | 260—37 SB X |
| 3,461,185 | 8/1969 | Brown | 260—37 SB X |
| 3,498,945 | 3/1970 | Lefort et al. | 260—37 SB |
| 3,532,649 | 10/1970 | Smith et al. | 260—37 SB X |

LEWIS T. JACOBS, Primary Examiner